Feb. 10, 1953 W. T. GRAHAM 2,627,798
CLAMP FOR VIBRATING SHANK PLOWS
Filed Aug. 27, 1951 4 Sheets-Sheet 1

INVENTOR.
William T. Graham.
BY
ATTORNEYS.

Feb. 10, 1953  W. T. GRAHAM  2,627,798
CLAMP FOR VIBRATING SHANK PLOWS
Filed Aug. 27, 1951  4 Sheets—Sheet 2

INVENTOR.
William T. Graham.
BY
Fishburn t Mullendore
ATTORNEYS.

Feb. 10, 1953 W. T. GRAHAM 2,627,798
CLAMP FOR VIBRATING SHANK PLOWS
Filed Aug. 27, 1951 4 Sheets-Sheet 3

INVENTOR.
William T. Graham.
BY
Fishburn & Mullendore
ATTORNEYS.

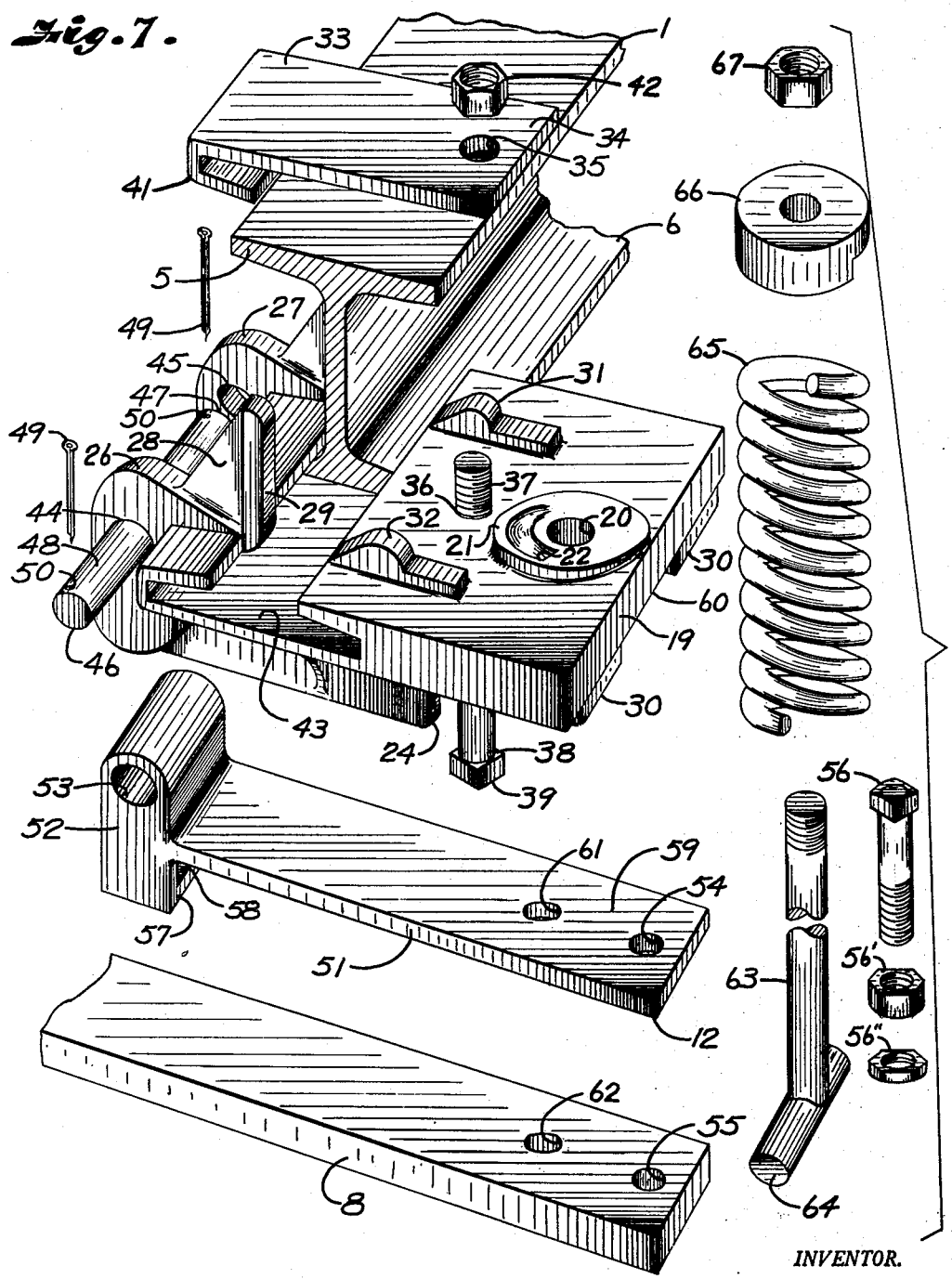

Patented Feb. 10, 1953

2,627,798

UNITED STATES PATENT OFFICE 2,627,798

CLAMP FOR VIBRATING SHANK PLOWS

William T. Graham, Amarillo, Tex.

Application August 27, 1951, Serial No. 243,893

2 Claims. (Cl. 97—184)

This invention relates to a plow of a type including ground conditioning tools that are carried on shanks having support on a mobile frame and which work under the surface to heave and break the soil and form alternate ridges and furrows having exposed surfaces composed of sod, straw and clods normally occurring on a field.

When the field contains rocks and other obstructions, it is desirable to mount the shanks of the ground working tools for rocking movement on the frame of the plow so that the ground working tools will pass freely over the obstructions and return to normal plowing position without injury to the plow.

It is therefore the principal object of the present invention to provide a simple and reliable mounting for attaching the shanks of the ground working tools to the mobile frame whereby the shanks may rock when necessary and vibrate under action when the plow is working in rocky and/or heavy soils. It is also an object of the invention to provide a mounting which includes a fixed part and a movable part pivotally connected with the fixed part and having a shank attaching portion to which the shank is rigidly secured and resiliently retained on the fixed part.

In accomplishing these and other objects of the invention hereinafter pointed out, I have provided improved structure, the preferred form of which is illustrated in the accompanying drawings, wherein:

Fig. 7 is a perspective view of the parts shown in disconnected and spaced relation to better illustrate the construction thereof.

Figure 1:
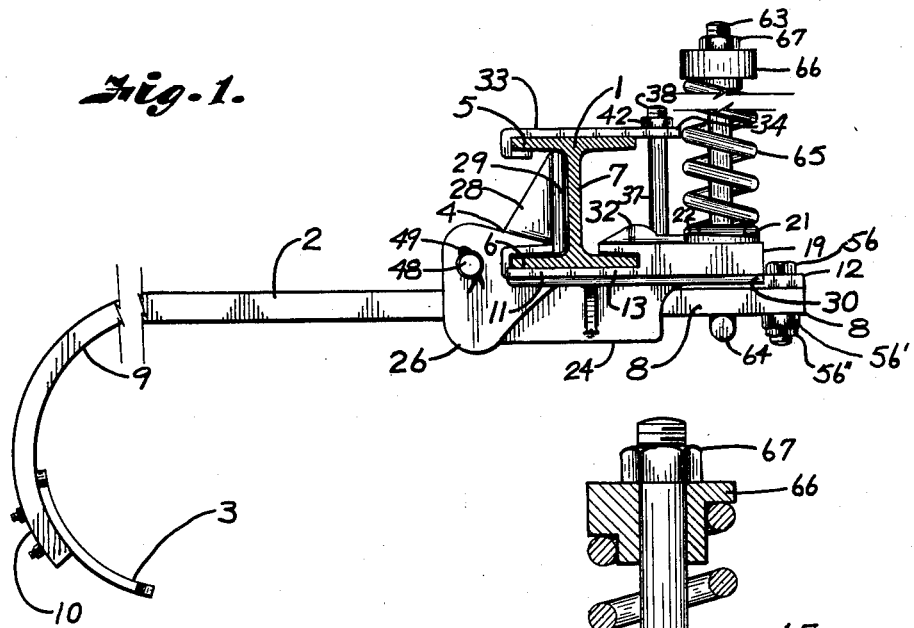
Fig. 1 is a vertical section through a frame member of a plow showing a mounting constructed in accordance with the present invention for resiliently attaching the shanks of the ground working tools whereby the shanks are adapted to rock relatively to the frame when passing over an obstruction and return to normal position after the obstruction has been passed.

Referring more in detail to the drawings:

1 designates a part of a plow frame to which the shanks 2 of the ground working tools 3 are attached by mountings generally indicated 4 and constructed in accordance with the present invention. Since all of the tool, shank and mounting assemblies are of like construction, only one of them is illustrated and described, it being understood that the plow may include one or more of the ground working devices.

The frame member 1, which composes a part of a plow frame, is illustrated as comprising an I-beam having upper and lower horizontally arranged flanges 5 and 6 that are interconnected by a vertical web 7. The shank 2 is formed of metal bar stock of substantially rectangular cross section and is of a width and thickness to provide the necessary strength and a certain amount of resiliency. The bar stock is shaped to provide a substantially straight end portion 8 extending in the direction of travel of the machine and a rearwardly and downwardly curved portion 9 terminating in a forwardly curved end 10 to carry the ground working tool 3. The straight end 8 of the shank extends transversely with respect to the frame member 1 and is adapted to rock transversely relatively to travel of the plow.

Figure 2:
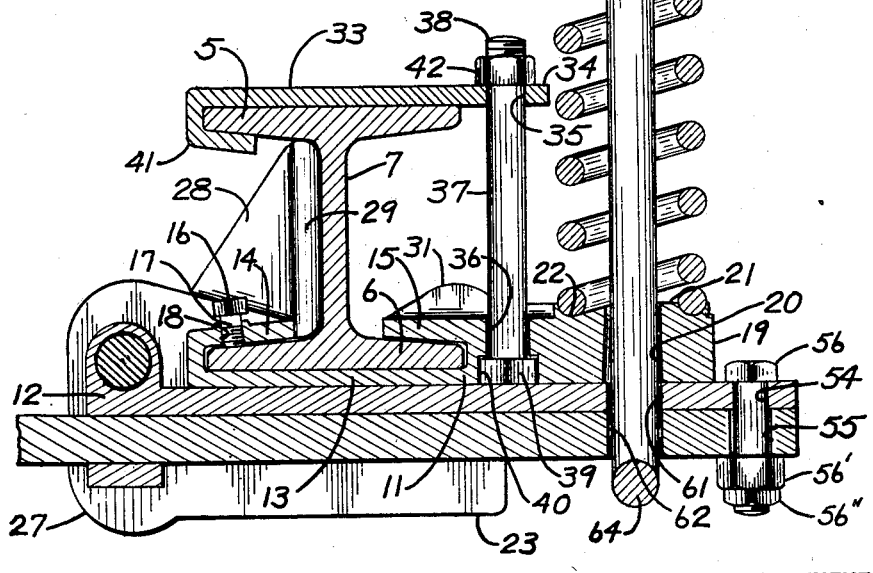
Fig. 2 is an enlarged longitudinal section through the frame member, the plow shank and the mounting by which the shank is pivotally connected with the frame member and resiliently held in normal plowing position, the section being taken on the line 2—2 of Fig. 4.
Figure 3:
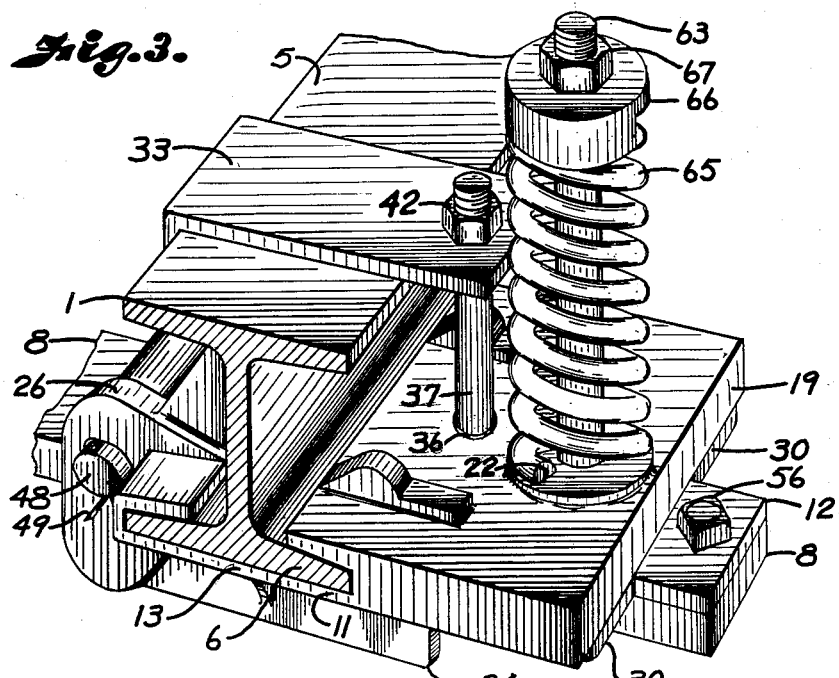
Fig. 3 is a perspective view of the structure disclosed in Fig. 2.
Figure 4:
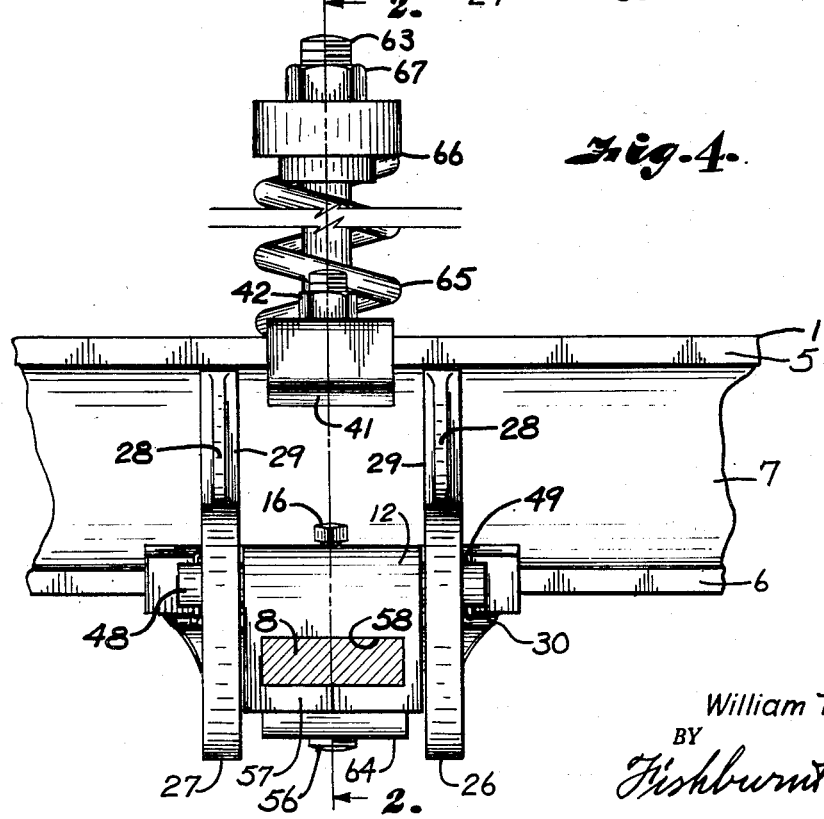
Fig. 4 is a rear elevational view, with the shank being shown in cross section.

Each mounting 4 includes a fixed part 11 and a movable part 12. The fixed part 11 has a substantially flat plate portion 13 substantially corresponding in length to the width of the lower flange 6 of the I-beam and which is closely engaged therewith by flanges 14 and 15 extending over the upper face of the lower flange 6, as best shown in Fig. 2. One of the flanges, for example the flange 14 preferably carries a set screw 16 that has its shank 17 threaded in an opening 18 of the flange to engage the upper face of the flange 6 and draw the plate portion 13 of the fixed part into engagement with the lower face of the flange and assure a firm connection with the I-beam.

Figure 5:
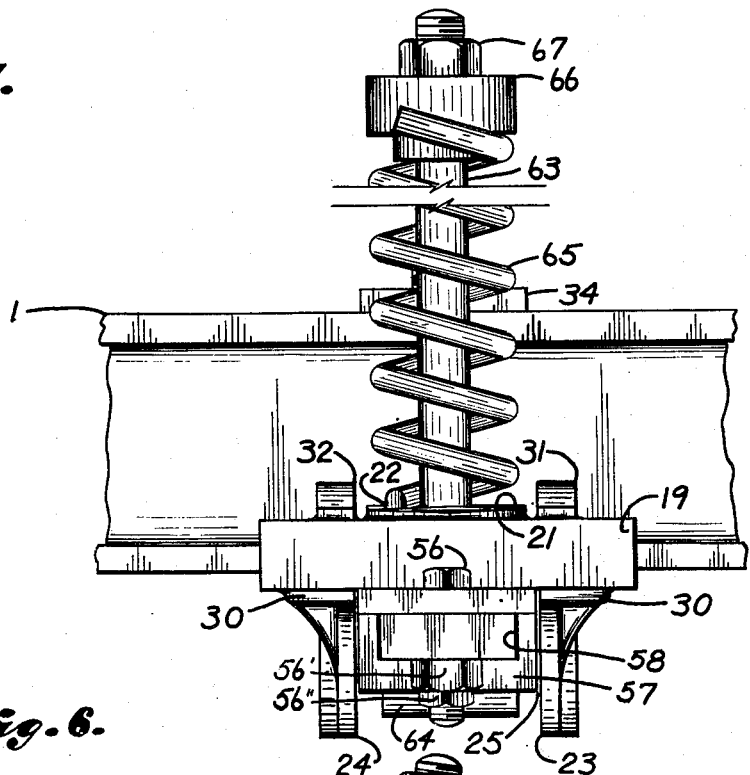
Fig. 5 is a front elevational view.

Projecting forwardly from the plate portion 13 and flange 15 is a relatively thicker extension 19 provided with a slot-like opening 20 extending through a boss 21 that forms a spring seat 22. Depending from the under side of the plate portion 13 and extending forwardly of a portion of the extension 19 are flanges 23 and 24 spaced apart to form a downwardly opening channel or way 25 therebetween and in which the movable part 12 of the mounting is adapted to rock along with the forward end portion 8 of the shank 2. Projecting rearwardly from the spaced flanges 23 and 24 are ears 26 and 27 that extend upwardly over the flange 14 and carry webs 28 that support abutments 29 which engage the rear face of the I-beam web 7 for distributing forces acting on the shank to the upper portion of the I-beam. The under side of the plate extension 19 may be reinforced by bosses 30 that extend forwardly on opposite sides of the channel or way 25, as shown in Figs. 5 and 7. It is obvious that the flange 14 of the fixed part is reinforced by the ears and webs 28. To reinforce the forward flange 15 the upper face of that flange and the extension 19 may be provided with spaced ribs 31 and 32, as best shown in Fig. 7.

Figure 6:
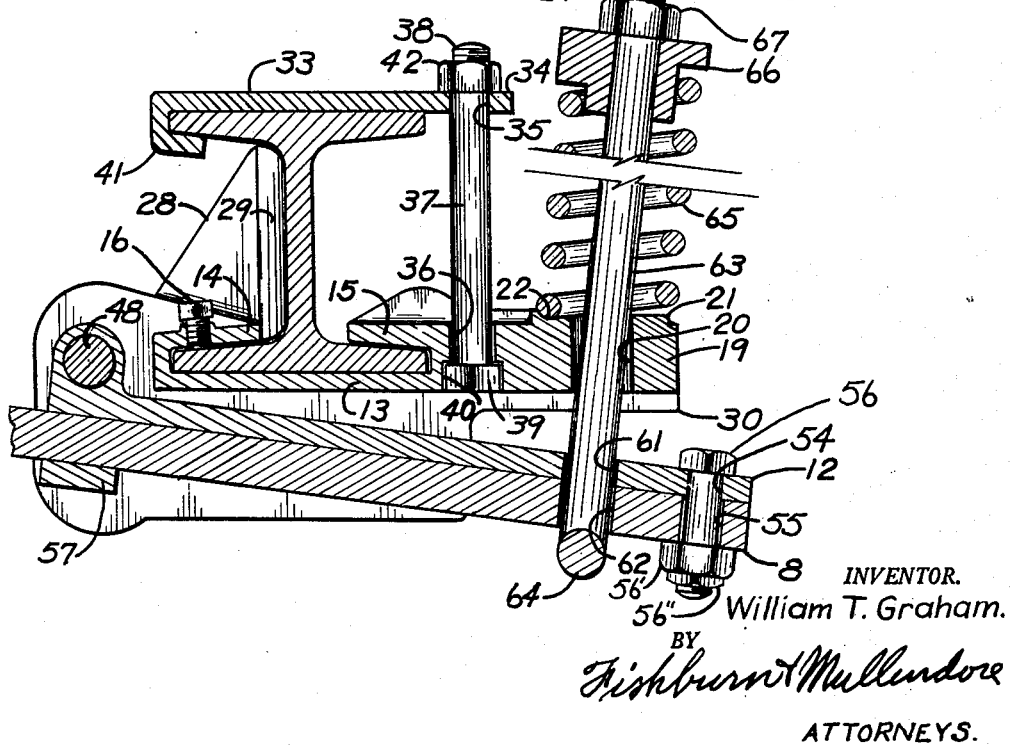
Fig. 6 is a longitudinal section similar to Fig. 2 but showing the shank and movable part of the mounting rocked relatively to the fixed part of the mounting.

In order to further attach the fixed part to the I-beam, the mounting may include a hook member 33 having a plate portion 34 that extends over the upper face of the upper I-beam flange 5 and which has an opening 35 aligning with an opening 36 in the forward extension of the fixed part to pass the shank 37 of a bolt 38, the head 39 of the bolt being countersunk within a recess 40 that is formed on the under face of the extension 19, as best shown in Figs. 2 and 6. The opposite end of the plate portion 33 has a downwardly and forwardly extending hook 41 that engages under the upper flange of the I-beam. The bolt 38 has a nut 42 threaded on the shank thereof to draw the parts tightly against the I-beam as shown in Figs. 2 and 6.

The ears 26 and 27 are provided above the level of the underface 43 of the plate portion 13 with registering openings 44 and 45 to mount the ends 46 and 47 of a transverse pin 48, the pin being retained in position by cotter pins 49 extending through suitable openings 50 in the projecting ends of the pin.

The movable part 12 includes an elongated plate portion 51 having a width to move freely within the channel or way 25 and the rear end has an upwardly extending transverse ear 52 that is provided with an opening 53 for passing the pin 48 to pivotally connect the movable part 12 with the fixed part 11. The plate portion 51 extends forwardly of the way and beyond the forward end of the extension 19 to accommodate an opening 54 that registers with a corresponding but slightly larger opening 55 in the end portion 8 of the shank 2 to pass a fastening device 56. The movable part also includes a depending loop 57 having a rectangular passageway 58 substantially conforming to the cross sectional shape of the end portion of the shank whereby the end portion 8 of the shank is passed therethrough and embraced by the loop portion to rock with the movable part on the pivot pin 48. The nut 56' of the bolt may be set up snug but is left sufficiently loose to permit slight longitudinal movement of the end portion of the shank relatively to the pivotal part of the clamp. The nut 56' is backed by a jam nut 56'' to prevent turning thereof after the nut 56' has been set.

The plow shank and movable part 12 of the mounting are resiliently retained in normal position with the upper face 59 of the plate portion 51 in clamping engagement with the under face 60 of the fixed part 11. This is effected by a resilient connection as now to be described. The end portion 8 of the shank and plate portion 51 of the movable part have elongated openings 61 and 62 that register with the slot-like opening 20 of the fixed part, as shown in Fig. 2. Extending through the registering openings 60, 61 and 20 is a rod 63 having a transverse head 64 on its lower end engaging under the end portion 8 of the plow shank. Sleeved over the rod and having one end engaging the spring seat 22 is a coil spring 65 having its upper end connected with the upper end of the rod by a washer-like spring seat 66 retained on the upper end of the rod by a nut 67, the nut being tightened on the rod to compress the spring 65 sufficiently to retain the shank 2 and movable part 12 in normal position but to allow rocking movement of the movable part when the shank is rocked. This rocking movement of the shank will cause the movable part 12 to pivot away from the fixed part 11 along with the forward end portion 8 of the shank 2 to effect compression of the spring 65 so that the stored up action in the spring will return the shank and movable part of the clamp to normal position with the plate portion 51 resiliently clamped against the fixed part 11 of the mounting as shown in Fig. 2.

In assembling the mounting, the fixed part 11 is slid over an end of the I-beam 1 and moved to the desired location thereon along with other of the mountings not shown. The hook member 33 is then placed over the upper flange 5 of the I-beam with the hook 41 engaged with the flange after which the bolt 38 is applied and the nut 42 tightened to draw the fixed part 11 tightly against the lower flange 6 of the I-beam. The set screw 16 may then be tightened to further secure the fixed part of the mounting. The end portion 8 of the plow shank 2 is then passed through the opening 57 of the loop portion of the movable part 12 until the opening 55 registers with the opening 54. The fastening device 56 is then inserted through the registering openings 54 and 55 to secure the shank to the movable part of the mounting. The movable part 12 and forward end 8 of the shank are then placed within the downwardly opening way 25 of the fixed part 11 and the pivot pin 48 is passed through the openings 44, 45 and 53 in the registering ears 26, 27 and 52 after which the cotter pins 49 are inserted in the openings 50.

The rod 63 is then passed through the openings 61, 62, and 20 and the coil spring 65 is sleeved thereover to engage the seat 22. The spring seat 66 is then applied over the upper threaded end of the rod to engage the upper end of the spring after which the nut 67 is applied to compress the spring and draw the movable part 12 into clamping engagement with the fixed part 11, sufficient tension having been applied to normally retain the shank and tool 3 in plowing position.

When the plow is in operation the ground working tool 3 may engage an obstruction. However, the tool is free to ride over the top of the obstruction upon upward rocking movement of the shank 2, the shank moving with the movable part 12 of the mounting about the axis of the pivot pin 48 so that the forward end 8 of the shank moves downwardly to cause the rod 63 to further compress the spring 65 whereby the spring 65 is enabled to return the shank 2 and movable part 12 to their normal position after the ground working tool has passed over the obstruction.

During operation of the plow, there is also a vibratory or pumping movement of the ground working tool that acts to reduce the draft and facilitate operation of the ground working tool in plowing up and heaving the soil to form the ridges and furrows. The pumping action of the ground working tools work the fine soil downwardly to form the seed bed and the larger clods, straw and the other mulching materials are worked to the surface for covering the fine soil and serving as a mulch to preserve the moisture.

From the foregoing it is obvious that I have provided a plow structure wherein the shanks of the ground working tools are attached to the plow frame in a manner to permit the desired rocking action of the plow shanks in a simple and efficient manner and without producing destructive strains on the plow frame or excessive wear on the mounting parts.

What I claim and desire to secure by Letters Patent is:

1. In a plow having a frame and a ground working tool provided with a shank adapted to rock relatively to the frame when the plow is in operation in a forward direction, a mounting for pivotally attaching and supporting the shank of the ground working tool to a transverse member of the frame, the mounting including a fixed member adapted to be fixed to the transverse member of the frame and having a longitudinally extending underface terminating forwardly of the transverse member to which said mounting is adapted to be fixed, the fixed member having ears extending rearwardly from said underface at the sides thereof, a shank attaching member having an elongated plate portion provided with an upper face corresponding with and normally in contact with said underface of the fixed member and provided with a longitudinally extending underface in engagement with a corresponding upper face of the shank whereby the plate portion of the shank attaching member is between the shank and the fixed member, means connecting the elongated plate portion with the shank for maintaining the upper face of the shank in constant continuous contact with the underface of said plate portion of the shank attaching member, a transverse pin pivotally connecting the shank attaching member to the fixed member at the rear ends of said normally contacting faces and whereon the shank attaching member pivots upon rocking movement of the shank, a coil spring having one end seated on the forward end of the fixed member, and means having connection with the forward end of the shank and with the other end of the coil spring whereby the spring yieldably maintains said normal contact of the upper face of the plate portion of the shank attaching member with the underface of the fixed member to maintain the normal plowing depth of the ground working tool.

2. In a plow having a frame and a ground working tool provided with a shank adapted to rock relatively to the frame when the plow is in operation in a forward direction, a mounting for pivotally attaching and supporting the shank of the ground working tool to a transverse member of the frame, the mounting including a fixed member adapted to be fixed to the transverse member of the frame and having a longitudinally extending underface terminating forwardly of the transverse member to which said mounting is adapted to be fixed, the fixed member having ears extending rearwardly from said underface at the sides thereof, a shank attaching member having an elongated plate portion provided with an upper face corresponding with and normally in contact with said underface of the fixed member and provided with a longitudinally extending underface in engagement with a corresponding upper face of the shank whereby the plate portion of the shank attaching member is between the shank and the fixed member, said shank attaching member having a lug extending upwardly between said ears of the fixed member and disposed at the rear end of the plate portion and above the plane of the underface of the fixed member, said shank attaching member having depending means embracing the shank at the rear end of said plate portion, a bolt connecting the forward end of the plate portion with the forward end of the shank and cooperating with the shank embracing means in maintaining the upper face of the shank in constant continuous contact with the underface of said plate portion, a pivot pin extending transversely through said lug and carried by the ears with the axis thereof above the plane of the underface of the fixed member whereby the normally contacting face of the shank attaching member immediately moves out of contact with and away from the face of the fixed member when the shank attaching member pivots upon rocking movement of the shank, a coil spring having one end seated on the forward end of the fixed member, and means having connection with the forward end of the shank and with the other end of the coil spring whereby the spring yieldably maintains said normal contact of the upper face of the plate portion of the shank attaching member with the underface of the fixed member.

WILLIAM T. GRAHAM.

REFERENCES CITED

The following references are of record in the file of this patent:

UNITED STATES PATENTS

| Number | Name | Date |
|---|---|---|
| 417,775 | Drader et al. | Dec. 24, 1889 |
| 2,014,451 | Pfeifer | Sept. 17, 1935 |
| 2,493,811 | Graham | Jan. 10, 1950 |

FOREIGN PATENTS

| Number | Country | Date |
|---|---|---|
| 57,391 | Denmark | Mar. 18, 1940 |
| 111,910 | Australia | Nov. 8, 1940 |